(12) United States Patent
Puvvada et al.

(10) Patent No.: US 11,100,084 B2
(45) Date of Patent: Aug. 24, 2021

(54) CONFIGURATION MANAGEMENT IDENTIFICATION RULE TESTING

(71) Applicant: ServiceNow, Inc., Santa Clara, CA (US)

(72) Inventors: Madhavi Puvvada, Sammamish, WA (US); Manish Gupta, Redmond, WA (US); Nikhil Lakshman, Bellevue, WA (US); Purushottam Amradkar, Sammamish, WA (US)

(73) Assignee: ServiceNow, Inc., Santa Clara, CA (US)

( * ) Notice: Subject to any disclaimer, the term of this patent is extended or adjusted under 35 U.S.C. 154(b) by 168 days.

(21) Appl. No.: 15/588,041

(22) Filed: May 5, 2017

(65) Prior Publication Data
US 2018/0322163 A1 Nov. 8, 2018

(51) Int. Cl.
*G06F 16/27* (2019.01)
*G06F 16/28* (2019.01)
(Continued)

(52) U.S. Cl.
CPC ...... *G06F 16/2365* (2019.01); *G06F 11/3051* (2013.01); *G06F 11/36* (2013.01);
(Continued)

(58) Field of Classification Search
CPC ........... G06F 17/30371; G06F 11/0727; G06F 17/30507; G06F 17/30598; G06F 16/217;
(Continued)

(56) References Cited

U.S. PATENT DOCUMENTS 5,978,594 A  11/1999  Bonnell
6,321,229 B1  11/2001  Goldman
(Continued)

FOREIGN PATENT DOCUMENTS

EP  1667062 A1  6/2006

OTHER PUBLICATIONS

Extended European Search Report for European Application No. 18164706.6 dated Sep. 19, 2018; 11 pgs.
(Continued)

*Primary Examiner* — Matthew Ell
*Assistant Examiner* — Berhanu Mitiku
(74) *Attorney, Agent, or Firm* — Fletcher Yoder PC

(57) ABSTRACT

A system, method, and non-transitory computer-readable storage medium are provided for configuration management identification rule testing. The system includes a processor and a memory. The memory includes instructions executable by the processor to identify, using an identification rule, criterion attributes corresponding to a selected configuration item class and to identify, using the identification rule, a container level associated with the selected configuration item class. The memory further includes instructions executable by the processor to identify container level criterion attributes corresponding to the container level and to receive respective values associated with at least one of the criterion attributes and at least one of the container level criterion attributes. The memory further includes instructions executable by the processor to generate a configuration management database payload using the respective values, simulate identification of the configuration management database payload using the identification rule, and generate debugging information associated with the simulated identification.

20 Claims, 12 Drawing Sheets

(51) Int. Cl.
*G06F 16/23* (2019.01)
*G06F 11/36* (2006.01)
*G06F 11/30* (2006.01)
*G06F 16/21* (2019.01)

(52) U.S. Cl.
CPC ........ *G06F 11/362* (2013.01); *G06F 11/3664* (2013.01); *G06F 16/217* (2019.01); *G06F 16/27* (2019.01); *G06F 16/28* (2019.01)

(58) Field of Classification Search
CPC ..... G06F 16/27; G06F 16/28; H04L 41/0853; H04L 41/0856
See application file for complete search history.

(56) References Cited

U.S. PATENT DOCUMENTS

| | | | |
|---|---|---|---|
| 6,678,887 | B1 | 1/2004 | Hallman |
| 6,799,189 | B2 | 9/2004 | Huxoll |
| 6,816,898 | B1 | 11/2004 | Scarpelli |
| 6,895,586 | B1 | 5/2005 | Brasher et al. |
| 7,027,411 | B1 | 4/2006 | Pulsipher |
| 7,392,300 | B2 | 6/2008 | Anantharangachar |
| 7,617,073 | B2 | 11/2009 | Trinon |
| 7,685,167 | B2 | 3/2010 | Mueller |
| 7,877,783 | B1 | 1/2011 | Cline |
| 7,933,927 | B2 | 4/2011 | Dee |
| 7,945,860 | B2 | 5/2011 | Vambenepe |
| 8,082,222 | B2 | 12/2011 | Rangarajan |
| 8,346,752 | B2 | 1/2013 | Sirota |
| 8,380,645 | B2 | 2/2013 | Kowalski |
| 8,554,750 | B2 | 10/2013 | Rangaranjan |
| 8,646,093 | B2 | 2/2014 | Myers |
| 8,683,032 | B2 | 3/2014 | Spinelli |
| 8,745,040 | B2 | 6/2014 | Kowalski |
| 8,812,539 | B2 | 8/2014 | Milousheff |
| 8,818,994 | B2 | 8/2014 | Kowalski |
| 8,907,988 | B2 | 12/2014 | Poston |
| 9,015,188 | B2 | 4/2015 | Behne |
| 9,037,536 | B2 | 5/2015 | Vos |
| 9,137,115 | B2 | 9/2015 | Mayfield |
| 9,261,372 | B2 | 2/2016 | Cline |
| 9,323,801 | B2 | 4/2016 | Morozov |
| 9,412,084 | B2 | 9/2016 | Kowalski |
| 9,467,344 | B2 | 10/2016 | Gere |
| 9,534,903 | B2 | 1/2017 | Cline |
| 9,557,969 | B2 | 1/2017 | Sharma |
| 9,613,070 | B2 | 4/2017 | Kumar |
| 9,631,934 | B2 | 4/2017 | Cline |
| 9,659,051 | B2 | 5/2017 | Hutchins |
| 9,792,387 | B2 | 10/2017 | George |
| 9,852,165 | B2 | 12/2017 | Morozov |
| 10,002,203 | B2 | 6/2018 | George |
| 2006/0037000 | A1* | 2/2006 | Speeter ................. H04L 67/125 717/120 |
| 2007/0239700 | A1 | 10/2007 | Ramachandran |
| 2009/0319932 | A1 | 12/2009 | Robinson et al. |
| 2010/0211932 | A1* | 8/2010 | Jones ........................ G06F 8/20 717/124 |
| 2011/0225567 | A1 | 9/2011 | Livney et al. |
| 2013/0297603 | A1 | 11/2013 | Brenker et al. |
| 2014/0280268 | A1* | 9/2014 | McKay ................. H04L 67/34 707/758 |
| 2017/0344457 | A1* | 11/2017 | Wagiaalla ........... G06F 11/3664 |
| 2018/0067845 | A1* | 3/2018 | Costello, Jr. ........ G06F 11/3684 |

OTHER PUBLICATIONS

Extended European Search Report for European Patent Application No. 19218260.8 dated Feb. 24, 2020, 8 pgs.

* cited by examiner

CONFIGURATION MANAGEMENT IDENTIFICATION RULE TESTING

TECHNICAL FIELD

This disclosure relates in general to systems and techniques for configuration management identification rule testing.

BACKGROUND

To facilitate the management of IT systems, configuration management services provide administrators a process by which a configuration management database ("CMDB") can be populated by configuration items ("CI") that represent components of the IT systems. The CMDB may be utilized by IT administrators to design and maintain an organization's computer network. For example, using CIs stored in the CMDB by the configuration management service, an IT administrator can monitor the status of the hardware or software connected to provide a software service of the computer network. Such configuration management services may require that an IT administrator monitor CIs being populated in the CMDB by the configuration management service, for example, by validating that information associated with the CIs being populated in the CMDB is appropriate.

SUMMARY

Disclosed herein are implementations of configuration management identification rule testing.

In an implementation, a system is provided for configuration management identification rule testing. The system includes a processor and a memory. The memory includes instructions executable by the processor to identify, using an identification rule, criterion attributes corresponding to a selected configuration item class and to identify, using the identification rule, a container level associated with the selected configuration item class. The memory further includes instructions executable by the processor to identify container level criterion attributes corresponding to the container level and to receive respective values associated with at least one of the criterion attributes and at least one of the container level criterion attributes. The memory further includes instructions executable by the processor to generate a configuration management database payload using the respective values, to simulate identification of the configuration management database payload using the identification rule, and to generate debugging information associated with the simulated identification.

In an implementation, a method is provided for configuration management identification rule testing. The method includes identifying, using an identification rule, criterion attributes corresponding to a selected configuration item class and identifying, using the identification rule, a container level associated with the selected configuration item class. The method further includes identifying container level criterion attributes corresponding to the container level, receiving respective values associated with at least one of the criterion attributes and at least one of the container level criterion attributes, and generating a configuration management database payload using the respective values.

In an implementation, a non-transitory computer-readable storage medium, including executable instructions that, when executed by a processor, facilitate performance of operations. The operations include identifying, using an identification rule, criterion attributes corresponding to a selected configuration item class and identifying, using the identification rule, a container level associated with the selected configuration item class. The operations further include identifying container level criterion attributes corresponding to the container level and receiving respective values associated with at least one of the criterion attributes and at least one of the container level criterion attributes. The operations further include generating a configuration management database payload using the respective values, simulating identification of the configuration management database payload using the identification rule, and generating debugging information associated with the simulated identification.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 7 is a diagram of an example display region generated for presenting information associated with a configuration management database payload in accordance with implementations of the present disclosure.

FIGS. 8 and 9 are diagrams of an example display region generated for presenting configuration management debugging information in accordance with implementations of the present disclosure

DETAILED DESCRIPTION

Figure 1:
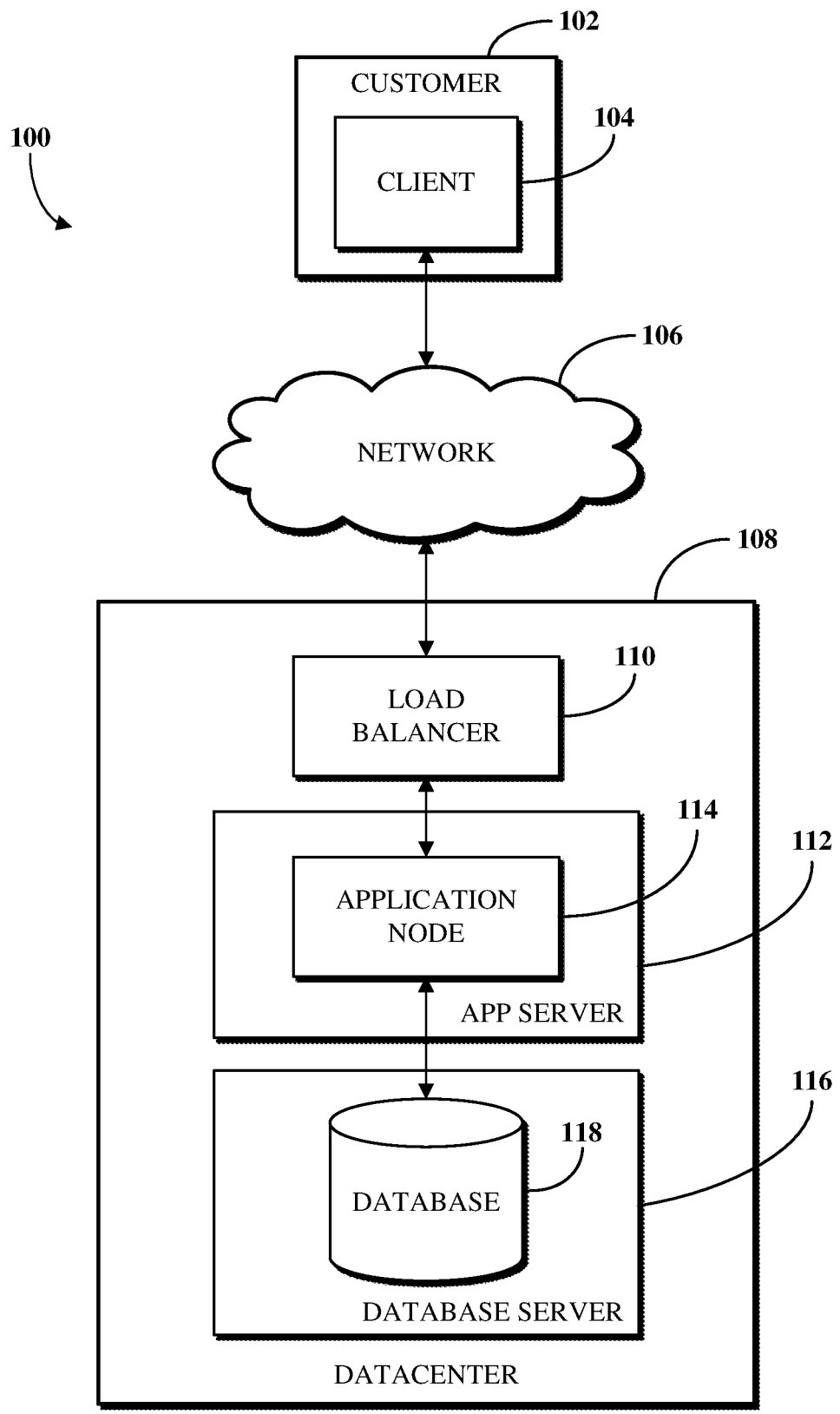
FIG. 1 is a block diagram of an example of an electronic computing and communications system in accordance with implementations of the present disclosure.

Individuals and organizations, such as businesses and governmental agencies, may utilize computers on a daily basis to perform a variety of functions. These functions may include, for example, email, internet access, word processing, computer-aided design, media streaming, and many others. Indeed, individuals and organizations not only utilize their own computers to perform these functions, but since many of the functions are "cloud-based," many individuals and organizations utilize servers in data centers around the globe to perform many of these functions.

As organizations grow, the number of users and, thus, computers and associated devices, such as file servers, email servers, routers, etc., increase as well. Hence, many organizations utilize Information Technology Operations Management ("ITOM") tools to manage such systems. The ITOM tools may include policies, processes, and procedures to design and maintain the computers and associated functionalities for an organization. For example, ITOM tools may keep track of user computers and associated software, servers, routers, etc., within an organization so that administrators can determine when users have been added or removed, when equipment has been added, removed, or needs to be upgraded, when software needs to be updated, etc.

When dealing with individuals or small organizations, such tasks can be relatively straight forward and easy to perform. However, as organizations and their associated information technology ("IT") infrastructure grows, designing and maintaining such systems can be a difficult task. To facilitate the management of IT systems in such organizations, configuration management services are available to provide administrators a process by which a configuration management database ("CMDB") can be populated by configuration items ("CI") that represent components of the IT systems. Some of these configuration management services may be cloud-based where an ITOM service provider maintains one or more datacenters that can facilitate configuration management services within an organization's network or networks to perform such configuration management services, while other configuration management services may be performed "on-premises" by IT administrators utilizing configuration management software residing within the organization's computer network.

The CMDB may be utilized by IT administrators to design and maintain an organization's computer network. For example, using CIs stored in the CMDB, an IT administrator can monitor the status of the hardware or software connected to provide a software service of the computer network.

Components associated with an electronic computing and communications system can be represented as CIs in a CMDB. The CMDB can be, for example, implemented using database software used by platform software operating within a datacenter. The platform software can, for example, be part of a Platform-as-a-Service cloud computing environment. The platform software can, for example, use the CMDB to provide reports to users of the platform software of CIs stored in the CMDB, populate or update the CMDB based on input, such as from a discovery operation, an input file, or a user, integrate with an external application to provide CMDB data to the external application or receive changes to CMDB data from the external application, or combinations thereof.

A component can be any aspect of a computing and communications system or a subset thereof. For example, components can include software components (such as a web server instance, a database server instance, configuration files, or the like), hardware components (such as a server device, laptop device, router, switch, load balancer, or the like), or other types of components (such as a software license, service level agreement, or the like). A component can have one or more relationships with one or more other components. For example, a first component can reside (e.g., be hosted) on a second component. The first component can be represented by a first CI and the second component can be represented by a second CI in the CMDB. A relationship between the first component and the second component can be represented by metadata, such as attributes, associated with the first CI and the second CI. For example, the first CI can include an attribute that indicates that the first CI is hosted on the second CI and the second CI can include an attribute that indicates that the second CI hosts the first CI. Other types of relationships can be used, such as a connection relationship, a dependency relationship, a use relationship, a runs on relationship, a contained within relationship, or the like.

A CMDB can be populated by a payload from one or more different data sources. For example, the one or more data sources can include a discovery application, a CMDB migration application, a user input application, other suitable data sources, or a combination thereof. Data included in a payload from the one or more different data sources can include data that does not meet, or is inconsistent with, desired standards for data entry into the CMDB. For example, a payload can include a plurality of CIs received from the data source. For example, a CMDB migration application can generate a payload by extracting CIs from a first CMDB and attempt to populate a second CMDB with the CIs associated with the payload. In some implementations, the payload can be stored in an import set including information about components. An import set can include a comma separated file, an Excel file, other suitable files, or combinations thereof.

A payload can include CI attributes that are inconsistent with a set of identification rules associated with a CMDB receiving the payload. Such a CMDB can be provided by ServiceNow, Inc. of Santa Clara, Calif. For example, the payload may be provided by a CMDB migration application that generates a payload by extracting CIs from another CMDB. In such a case, the other CMDB may not include a CMDB governance system and may not have identification rules. Thus, the data in the other CMDB can differ (e.g., be inconsistent with) in a desired structure or content of data in the CMDB. Accordingly, if the CMDB is populated with CIs associated with such a payload, the relationships that are inconsistent with the desired structure or content of the CMDB can be stored in the CMDB. This can result in a CMDB that is, for example, not reliable or accurate.

An improved approach to populating a CMDB with CIs associated with a payload can include systems and techniques that test whether the CIs being populated in the CMDB by a payload from the one or more data sources are consistent with a set of identification rules prior to populating the CMDB with the payload. The systems and techniques can identify information associated with the payload that is inconsistent with corresponding information associated with an identification rule. Such systems and techniques can include determining which information associated with a payload is consistent with corresponding information associated with the identification rule and which information associated with the payload is inconsistent with corresponding information associated with the identification rule.

Based on the determination, debugging information can be generated that indicates which information associated with a payload is consistent with corresponding information associated with the identification rule and which information associated with the payload is inconsistent with corresponding information associated with the identification rule. The debugging information may be stored in a log. In some implementations, debugging information stored in the log can be displayed on a report.

A CMDB can be governed by a set of rules. The set of rules can include identification rules, reconciliation rules, other suitable rules, or a combination thereof. In some implementations, the systems and techniques can identify identification rules and reconciliation rules corresponding to a payload and can identify metadata associated with the identification rules and the reconciliation rules. The systems and techniques can generate a unified rules set that represents metadata associated with the identified identification rules and the identified reconciliation rules.

Implementations of this disclosure provide technical improvements particular to computer networks, for example, those concerning CMDBs. Computer network-specific technical problems, such as identifying incorrect payload information prior to CIs associated with the payload being stored in a CMDB, can be wholly or partially solved by implementations of this disclosure. For example, information associated with a payload that is inconsistent with corresponding information associated with an identification rule can be identified and remedied prior to CIs associated with the payload being stored in the CMDB. The implementations of this disclosure introduce new and efficient improvements in the ways in which CMDB payloads and CI relationships stored in the CMDB can be consistent with relationship rules by preventing a CI relationship from being stored in the CMDB unless the CI relationship is consistent with a corresponding relationship rule.

To describe some implementations in greater detail, reference is first made to examples of hardware structures. FIG. 1 is a block diagram of an example of an electronic computing and communications system 100 in accordance with implementations of the present disclosure. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can be a public entity, private entity, or other corporate entity or individual that purchases or otherwise uses services of a software provider, such as a software-as-a-service ("SaaS") provider or a platform-as-a-service ("PaaS") provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. A client 104 associated with the customer 102 may connect to the network 106 via a communal connection point, link, or path and a client 104 associated with the customer 102 can connect to, or communicate via, the network 106 using a distinct connection point, link, or path. A connection point, link, or path can be wired, wireless, use other communications technologies, or a combination thereof.

The network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Any number of application servers or database servers can be implemented at the datacenter 108. The datacenter 108 can include servers other than or in addition to the application server 112 or the database server 116, for example, a web server.

The application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. The application nodes implemented on a single application server 112 can run on different hardware servers.

The database server 116 can be configured to store, manage, or otherwise provide data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100 can include an XML database and a CMDB. While limited examples are described, the database 118 can be configured as or comprise any suitable database type. Further, the system 100 can include one, two, three, or any suitable number of databases configured as or comprising any suitable database type or combination thereof.

The database 118 can be configured as a CMDB. A CMDB can include a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI. The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

The system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes.

The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
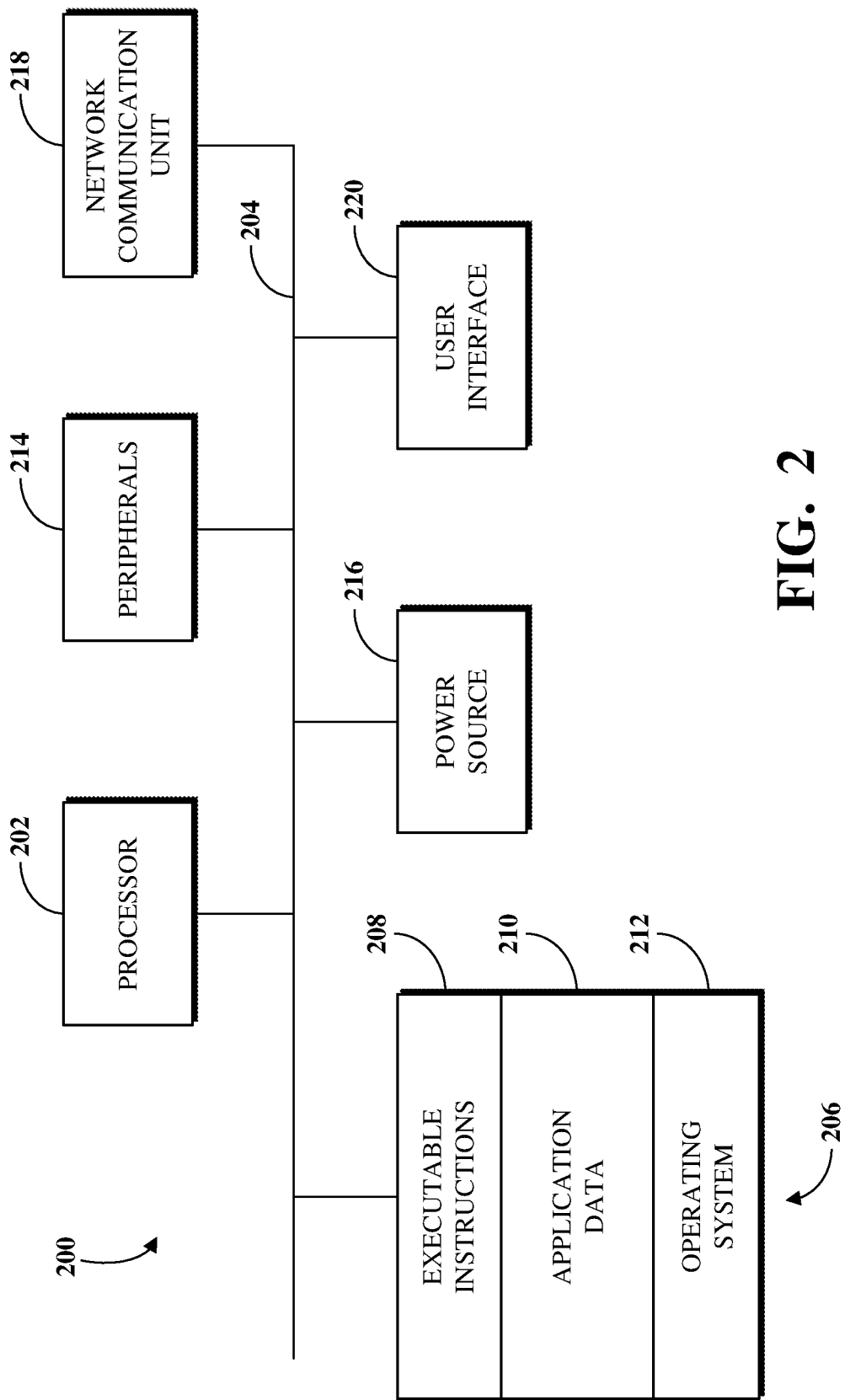
FIG. 2 is a block diagram of an example internal configuration of a computing device of an electronic computing and communications system in accordance with implementations of the present disclosure.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices. A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate a priority list of records. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage. The memory 206 can be distributed across multiple clients or servers, such as network-based memory or memory in multiple clients or servers performing the operations of clients or servers.

The peripherals 214 can be coupled to the processor 202 via the bus 204. The peripherals can be sensors or detectors, or devices containing any number of sensors or detectors, which can monitor the computing device 200 itself or the environment around the computing device 200. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214. The operations of the processor 202 can be distributed across multiple clients or servers, which can be coupled directly or across a local area or other suitable type of network.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. The user interface 220 can include a display, which can be a liquid crystal display (LCD), a cathode-ray tube (CRT), a light emitting diode (LED) display (e.g., an OLED display), or other suitable display. Although depicted here as a single bus, the bus 204 can be composed of multiple buses, which can be connected to one another through various bridges, controllers, or adapters.

Figure 3:
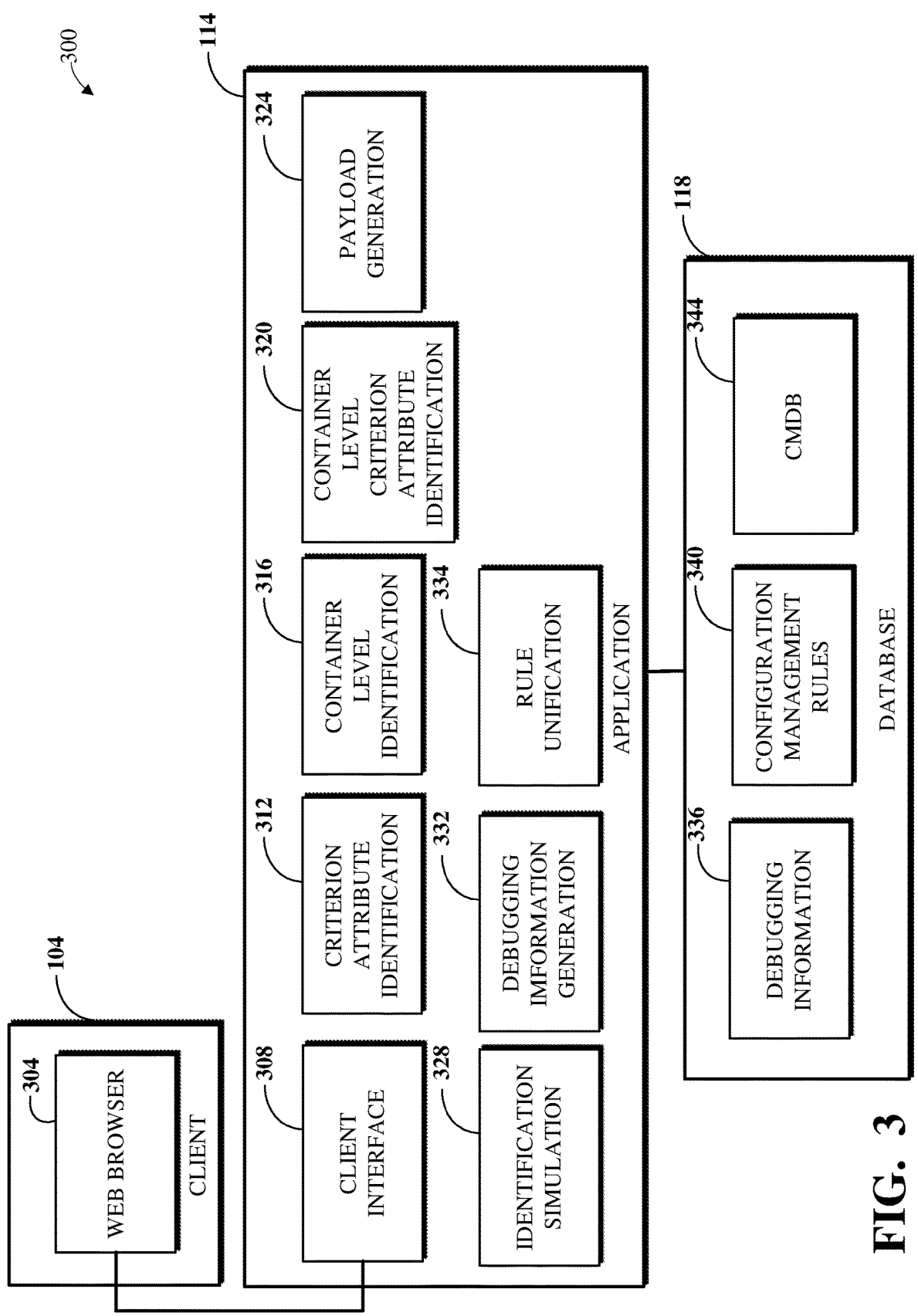
FIG. 3 is a block diagram of an example configuration management identification rule testing system in accordance with implementations of the present disclosure.

FIG. 3 is a block diagram of an example configuration management identification rule testing system 300 ("system 300") in accordance with implementations of the present disclosure. The system 300 can, for example, be implemented using an implementation of the electronic computing and communications system 100 of FIG. 1 or one or more implementations of computing devices 200 of FIG. 2. The system 300 can be implemented as part of platform software running on a datacenter, such as the datacenter 108. The platform software can be part of a Platform-as-a-Service (PaaS) which can be provided, for example, using the datacenter 108 of the computing system 100. In some examples, the components of the system 300 can be part of or associated with the platform software (e.g., software components associated with the platform software), scripts stored on the datacenter 108 that are executed by the platform software, or combinations thereof. For example, the criterion attribute identification 312 can be implemented using a script stored in the database 118 and executed by the application node 114. As another example, the criterion attribute identification 312 can be implemented using Java, C, or a similar programming language, that can be compiled or interpreted and included in or associated with the platform software. The platform software can execute the modules of the system 300 such as the criterion attribute identification 312.

The system 300 can be configured to provide configuration management identification rule testing. Configuration management identification rule testing can include generating a configuration management database ("CMDB") payload, identifying an identification rule corresponding to the CMDB payload, simulating identification of the CMDB payload, generating debugging information associated with the simulated identification of the CMDB payload, or a combination thereof. The system 300 can include a client, such as the client 104 of FIG. 1, an application node, such as the application node 114 of FIG. 1, a database, such as the database 118 of FIG. 1, or a combination thereof.

The client 104 can include the web browser 304. The application node 114 can include a client interface 308, a criterion attribute identification 312, a container level identification 316, a container level criterion attribute identification 320, a payload generation 324, an identification simulation 328, a debugging information generation 332, a rule unification 334, or a combination thereof. The components or modules shown with respect to application node 114 may be executed by or within application node 114 or other application nodes. The components or modules shown with respect to application node 114 may be wholly or in part stored outside of application node 114, for example in database 118 (and then may be retrieved for executed by application node 114). The database 118 can include debugging information 336, configuration management rules 340, a CMDB 344, or a combination thereof.

For example, the client 104 can be used by a user to launch a web browser 304. The web browser 304 can be configured to output, present, or display information associated with the computing system 100. For example, the client 104 can include a display device, such as a monitor. The web browser 304 can display the information on the display device associated with the client 104. For example, web browser 304 may be used to connect to application node 114 to send and receive data to and from application node 114 (and indirectly, to and from database 118). For example, web browser 304 may receive graphical user interfaces, such as those shown in FIGS. 6-12 from application node 114 and may display those graphical user interfaces on the display device.

Figure 6:
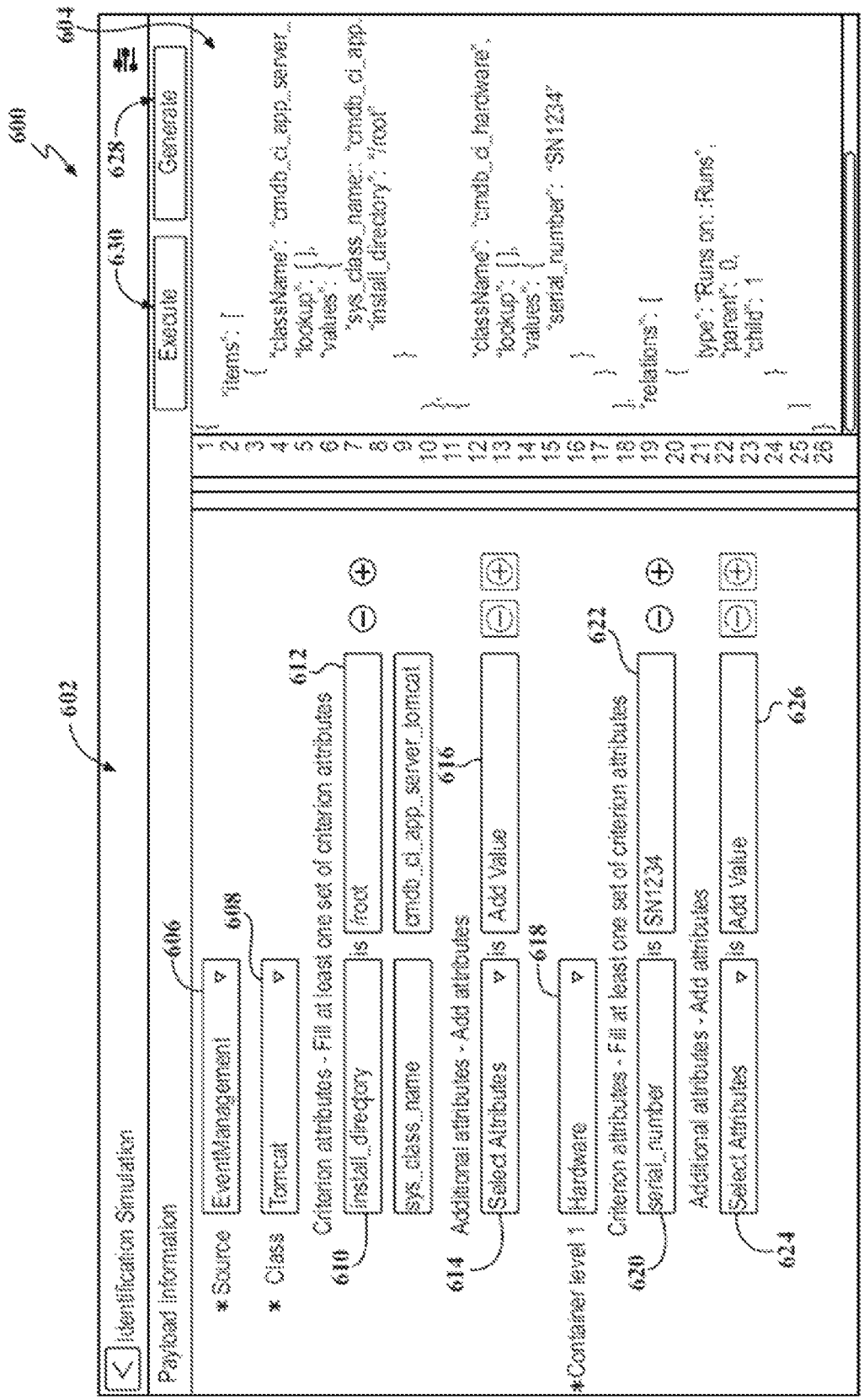
FIG. 6 is a diagram of an example display region generated for presenting information associated with configuration management identification rule testing and providing a user interface for receiving user input in accordance with implementations of the present disclosure.

The information displayed by the web browser 304 can include information associated with configuration management identification rule testing. In some implementations, the web browser 304 can be configured to receive user input associated with a CMDB payload. A CMDB payload can include information corresponding to a plurality of configuration items ("CIs") associated with a data source, as described above. The information corresponding to the plurality of CIs can include information indicating relationships between respective CIs, CI location information, CI metadata information, other suitable information, or a combination thereof. The web browser 304 can communicate the received user input to the client interface 308 of the application node 114. For example, the web browser 304 may receive a selected data source, as is generally illustrated in FIG. 6 at 606, and a selected CI class associated with the selected data source, as is generally illustrated in FIG. 6 at 608. The selected CI class can include a CI type corresponding to the plurality of CIs associated with the CMDB payload. The selected data source can include an event management database and the CI class can include Tomcat.

The web browser 304 communicates the selected data source and the selected configuration item class to the client interface 308.

In some implementations, the system 300 can be configured to identify an identification rule corresponding to the selected configuration item class. For example, the database 118 can include the configuration management rules 340. The configuration management rules 340 can include information corresponding to a plurality of configuration management rules. For example, the configuration management rules 340 can include information associated with configuration management governance rules. The configuration management governance rules can include identification rules and reconciliation rules. An identification rule can include identification information specifying attributes that uniquely identify a CI class. For example, an identification rule can include criterion attributes corresponding to the CI class, container level criterion attributes corresponding to a container level associated with a CI class, relationship information corresponding to the CI class, other suitable information, or a combination thereof. A reconciliation rule can include information corresponding to a data source. For example, a reconciliation rule can include information that indicates actions that a data source can take on CIs in a CMDB.

The application node 114 can identify an identification rule from the configuration management rules 340 corresponding to the selected CI class. The criterion attribute identification 312 can be configured to identify one or more criterion attributes associated with the selected CI class, as is generally illustrated in FIG. 6 at 610, based on identification information associated with the identification rule corresponding to the CI class. A criterion attribute can include information that identifies CIs associated with the selected CI class. For example, a criterion attribute can include directory information, naming information, other suitable information, or a combination thereof.

The container level identification 316 can be configured to identify one or more container levels corresponding to the selected CI using the identification information associated with the identification rule. An example, container level corresponding to a selected CI class is generally illustrated in FIG. 6 at 618. A container level can include a dependency associated with the selected CI class. For example, a CI class can include Tomcat. Tomcat can have a dependency on hardware (e.g., Tomcat runs on hardware, such as a server).

The container level criterion attribute identification 320 can be configured to identify one or more container level criterion attributes associated with each of the identified container levels. An example container level criterion attribute is generally illustrated in FIG. 6 at 620. A container level criterion attribute can include information that identifies CIs associated a respective container level. For example, an identified container level can include hardware. A container level criterion attribute associated with the container level can include a serial number that identifies the hardware.

In some implementations, values associated with identified criterion attributes and values associated with identified container level criterion attributes can be received by the web browser 304. For example, the client interface 308 can communicate the identified criterion attributes and the identified container level criterion attributes to the web browser 304. The web browser 304 can be configured to display the criterion attributes and the container level criterion attributes, as is generally illustrated in FIG. 6. A user can provide values associated with the criterion attributes and the container level criterion attributes. An example value associated with a criterion attribute is generally illustrated in FIG. 6 at 612 and an example value associated with a container level criterion attribute is generally illustrated in FIG. 6 at 622. For example, a user can provide a directory name corresponding to a criterion attribute that includes a directory associated with the selected CI class. The user can provide a serial number corresponding to a container level criterion attribute that includes a serial number associated with the container level.

The web browser 304 can communicate the received values to the client interface 308. In some implementations, the payload generation 324 can be configured to generate a CMDB payload using the selected data source, the selected CI class, the identified criterion attributes, received values associated with respective criterion attributes, the identified container level, the identified container level criterion attributes, received values associated with respective container level criterion attributes, or a combination thereof. An example, CMDB payload is generally illustrated in FIG. 6 at 604. Information associated with a generated CMDB payload can be stored in the database 118. In some implementations, the web browser 304 can be configured to display information associated with the CMDB payload. In some implementations, a CMDB payload can include a JavaScript object notation object.

In some implementations, the identification simulation 328 can simulate identification of the CMDB payload resulting in a simulated identification using the identification rule corresponding to the selected CI class. Simulating identification of a CMDB payload can include comparing received values associated with respective criterion attributes to corresponding identification values associated with the identification rule, comparing respective values associated with respective container level criterion values to corresponding identification values associated with the identification rule, or a combination thereof.

For example, the identification rule can include a criterion attribute corresponding to the selected CI class that indicates a directory, such as an install directory. A received value associated with the criterion attribute includes "/root" (e.g., the install directory for the selected CI class is the root directory). The identification simulation 328 compares the received value with a corresponding identification value associated with the identification rule. For example, the corresponding identification value can include an expected value corresponding to the criterion attribute associated with the selected CI class (e.g., the criterion attribute that includes the install directory). The identification simulation 328 determines whether the received value is consistent (e.g., the same or substantially the same) with the expected value or inconsistent (e.g., not the same or not substantially the same) with the expected value. For example, the expected value can include the "/root" install directory. While limited examples are described, the identification simulation 328 can determine whether received values other than those described herein are consistent or inconsistent with corresponding identification values.

In some implementations, the corresponding identification value can include a plurality of expected values. For example, the corresponding identification value can include two or more install directories that the selected CI class can include. The identification simulation 328 can be configured to determine whether the received values are consistent or inconsistent with at least one of the expected values associated with a corresponding identification value.

The identification simulation 328 can determine whether each received value associated with the CMDB payload is consistent or inconsistent with the corresponding identification values associated with the identification rule. The identification simulation 328 can be configured to communicate information indicating whether a received value is consistent or inconsistent with a corresponding identification value to the debugging information generation 332.

Figure 8:
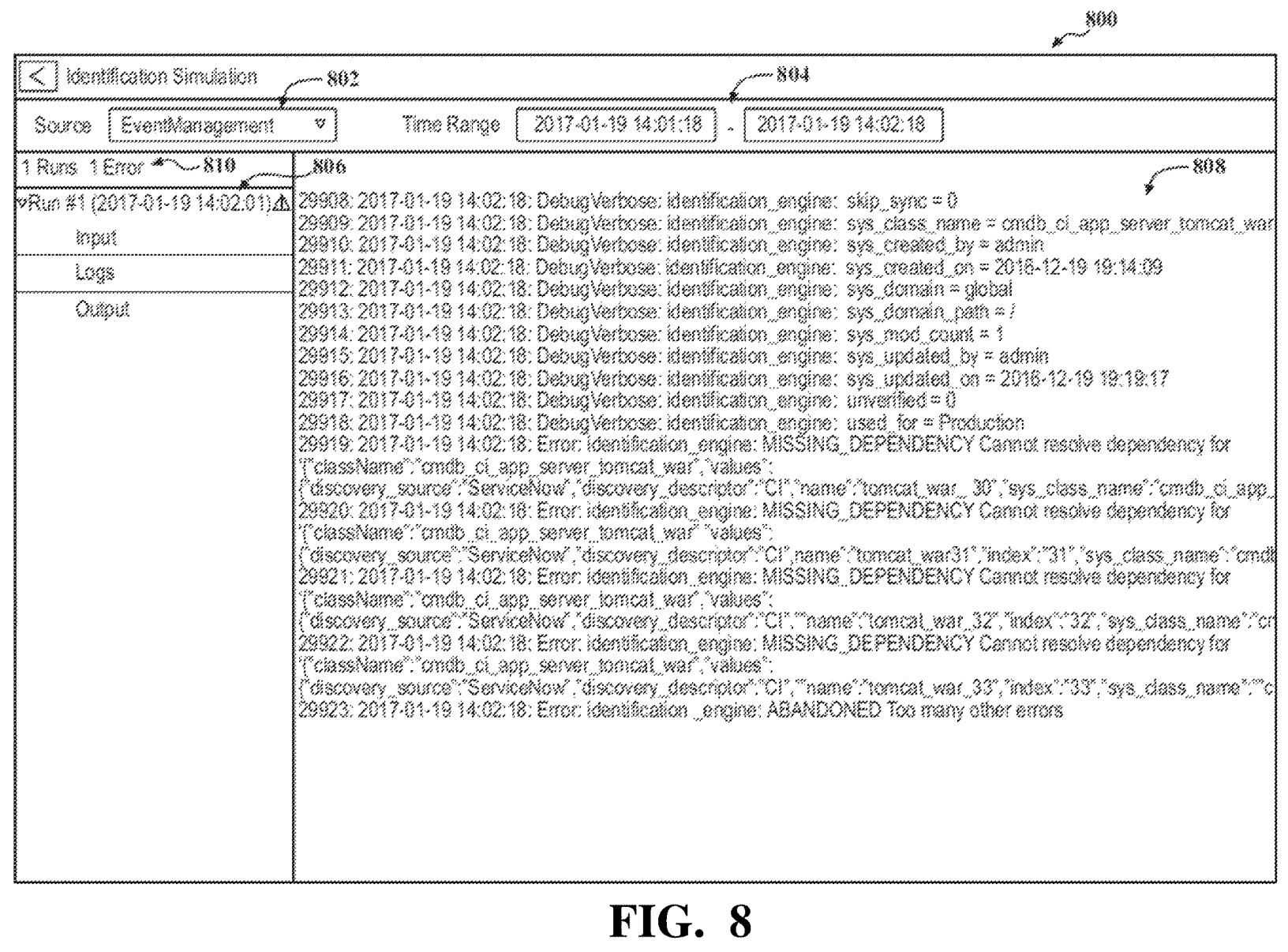

The debugging information generation 332 can be configured to generate debugging information corresponding to the information communicated by the identification simulation 328. Example debugging information is generally illustrated in FIG. 8 at 804. For example, the debugging information generation 332 generates debugging information that includes input information associated with the CMDB payload, log information corresponding to the information communicated by the identification simulation 328, output information associated with the CMDB payload, or a combination thereof.

The input information can include information associated with the CMDB payload. For example, the input information can include the selected data source, the selected CI class, the identified criterion attributes, received values corresponding to respective criterion attributes, the identified container levels, the identified container level criterion attributes, received values corresponding to container level criterion attributes, other suitable input information, or a combination thereof.

The log information can include information corresponding the information communicated from the identification simulation 328. For example, the log information can include information indicating a received value, a corresponding identification value, whether the received value is consistent or inconsistent with the identification value, information indicating one or more reasons why a received value is inconsistent with a corresponding identification value, other suitable information, or a combination thereof. For example, the log information includes the received value that includes "/root" and that corresponds to the identified criterion attribute that includes an install directory.

The log information includes an expected value associated with an identification value corresponding to the criterion attribute. The log information includes information indicating whether the received value is consistent with the expected value. When the received value is inconsistent with the expected value, the log information includes one or more reasons indicating why the received value is inconsistent with the expected value and possible recommendations to correct the inconsistencies. For example, the log information can include information that indicates that the expected value includes an install directory that is different from the "/root" directory.

The output information can include summary information indicating whether the simulated identification of the CMDB payload was successful. For example, the output information includes received values associated with the CMDB payload and an indication (e.g., an indicator) of the simulated identification. The indication of the simulated identification can include an indication that the received value was skipped during the simulated identification (e.g., the identification simulation 328 was unable to perform the simulated identification on the received value), an indication that the received value is inconsistent with a corresponding identification value, an indication that the received value is consistent with the corresponding identification value, other suitable output information, or a combination thereof.

The debugging information can be stored in the debugging information 336 on the database 118. The debugging information 336 can include debugging information associated with the simulated identifications, debugging information associated with identifications corresponding to production payloads, other suitable debugging information, or a combination thereof. A production payload can include a payload imported into a CMDB, such as the CMDB 344. Identification of the production payload can include determining whether the production payload is consistent with a corresponding identification rule and allowing or preventing CIs associated with the production payload to be stored in the CMDB 344 based on the determination.

In some implementations, the web browser 304 can be configured to display debugging information stored in the debugging information 336. For example, the web browser 304 can be configured to display debugging information generated in response to a simulated identification of a CMDB payload. In another example, the web browser 304 can be configured to display debugging information having a timestamp value within an identified time range. For example, a user can provide a time range to the web browser 304 or the web browser 304 can receive or retrieve the time range from any suitable source other than the user. The web browser 304 can communicate the time range to the client interface 308. The client interface 308 can query the debugging information 336 for debugging information having a timestamp value within the time range. The client interface 308 can communicate query results that include debugging information having timestamp values within the time range to the web browser 304. The web browser 304 can display the query results.

A user can review the debugging information and identify CMDB payloads that are inconsistent with corresponding identification rules. The user can determine whether to adjust values associated with CMDB payloads that are inconsistent with corresponding identification rules in order for the CMDB payloads to be consistent with the corresponding identification rules. In some implementations, CIs associated with CMDB payloads that are consistent with corresponding identification rules can be stored in the CMDB 344 and CIs associated with CMDB payloads that are inconsistent with corresponding identification rules cannot be stored the CMDB 344. In some implementations, the system 300 can determine whether an inconsistency between values associated with the CMDB payloads and corresponding identification rules are below an inconsistency threshold (e.g., nominal inconsistencies). The system 300 can ignore the inconsistencies below the inconsistency threshold and allow the CIs associated with the inconsistencies to be stored in the CMDB.

In some implementations, the system 300 can include the rule unification 334. The rule unification 334 can be configured to generate unified rules corresponding to the selected CI class. For example, the rule unification 334 can identify one or more configuration management rules stored in the configuration management rules 340 that correspond to the selected CI class. The one or more configuration management rules includes one or more identification rules corresponding to the selected CI class, one or more reconciliation rules corresponding to the selected CI class, one or more other rules corresponding to the selected CI class, or a combination thereof.

The configuration management rules corresponding to the selected CI class can include corresponding metadata. For example, metadata associated with an identification rule can include information indicating a dependency between a CI class associated with the identification rule and one or more other CI classes, information indicating a relationship between the CI class associated with the identification rule and one or more other CI classes, other suitable information, or a combination thereof.

In some implementations, the configuration management rules include similar metadata, conflicting metadata, metadata indicate dependencies between rules, metadata that indicate relationships between rules, other suitable metadata, or a combination thereof. The rule unification 334 can be configured to generate a set of unified rules that represents identified configuration management rules corresponding to the selected CI class and metadata associated with the identified configuration management rules. For example, the unified rules can include identified identification rules corresponding to the selected CI class, identified reconciliation rules corresponding to the selected CI class, and metadata that represents metadata associated with the identified identification rules and the identified reconciliation rules.

The unified rules can include metadata that resolves conflicts indicated by metadata associated with an identification rule and a reconciliation rule. The unified rules can include metadata that represents dependencies between one or more identification rules and one or more reconciliation rules indicated by metadata associated with the identification rules and metadata associated with the reconciliation rules. The unified rules can include metadata associated with containment rules and hosting rules associated with the identified configuration management rules. A containment rule can indicate a containment hierarchy for the selected CI class. A containment rule can represent an allowable containment relationship between the selected CI class and another CI class. For example, a web service CI class can contain a file CI class. A hosting rule can represent an allowable hosting relationship between the selected CI class and another CI class. For example, an application software CI type can be run on a hardware CI type. The rule unification 334 can store the unified rules in the configuration management rules 340.

Figure 10:
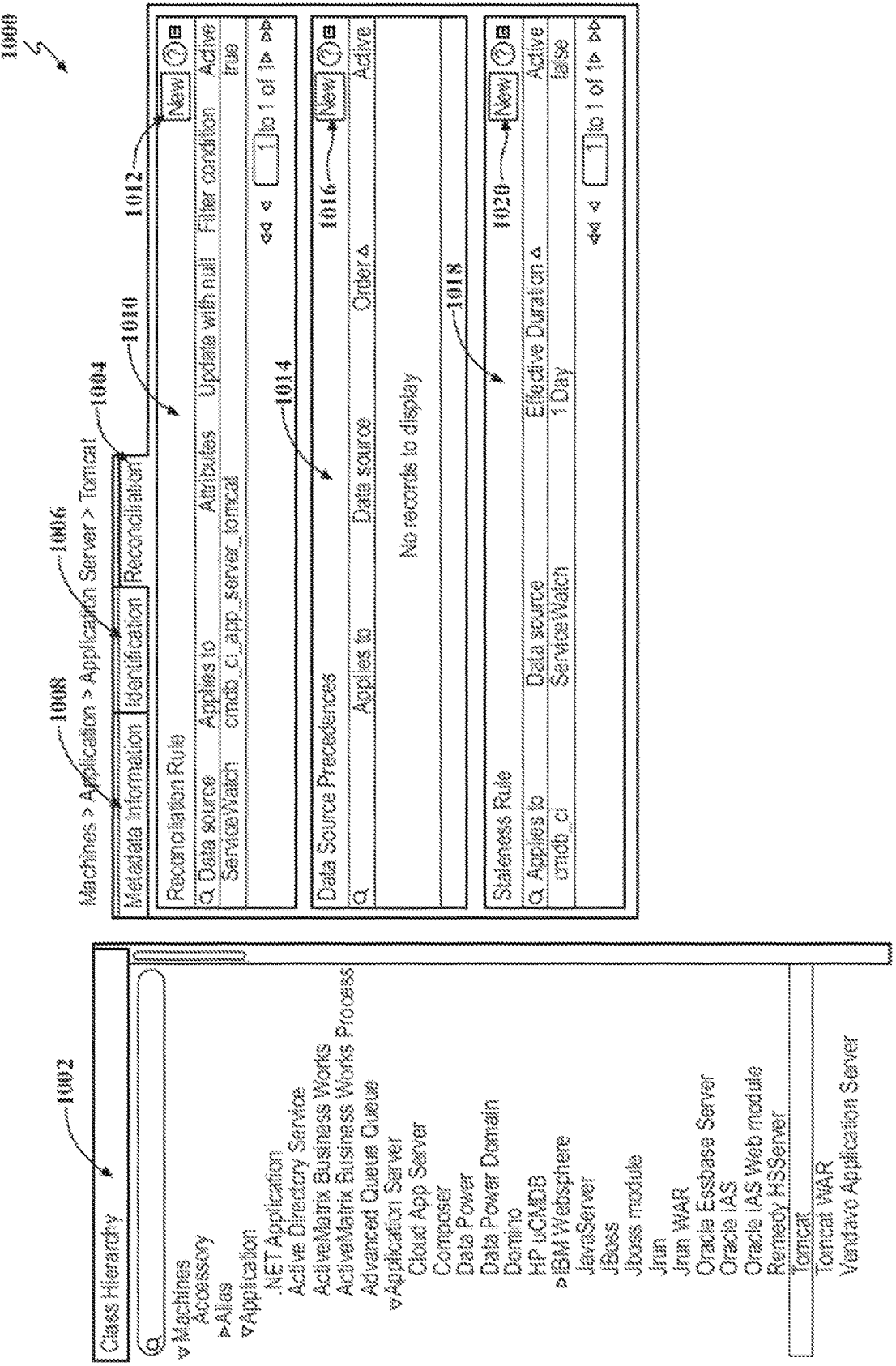
FIGS. 10-12 are diagrams of an example display region for presenting information associated with metadata rule unification in accordance with implementations of the present disclosure.

In some implementations, the web browser 304 can be configured to display the unified rules corresponding to the selected CI class. An example display including a set of unified rules corresponding to a selected CI class is generally illustrated in FIG. 10 at 1000. In some implementations, the web browser 304 can provide an interface for the user to create configuration management rules corresponding to a CI class using the unified rules, change characteristics of the configuration management rules using the unified rules, or a combination thereof. For example, a user can select a button on the web browser 304 to generate a new identification rule corresponding to the selected CI class.

When a user changes characteristics of one or more configuration management rules and/or generates a new configuration management rule, the web browser 304 can display rules associated with the configuration management rule being changed and/or created. For example, when a user creates a new identification rule, the web browser 304 displays reconciliation rules, metadata information, and/or other configuration management rules and/or information associated with the selected CI class corresponding to the new identification rule. The user can then change information, verify information, and/or create new information associated with the displayed configuration management rules and/or information corresponding to the selected CI class associated with the new identification rule. For example, when the user creates a new identification rule, the web browser 304 displays a reconciliation rule corresponding to the selected CI class. The use can update the reconciliation rule to reflect information associated with the new identification rule.

Figure 4:
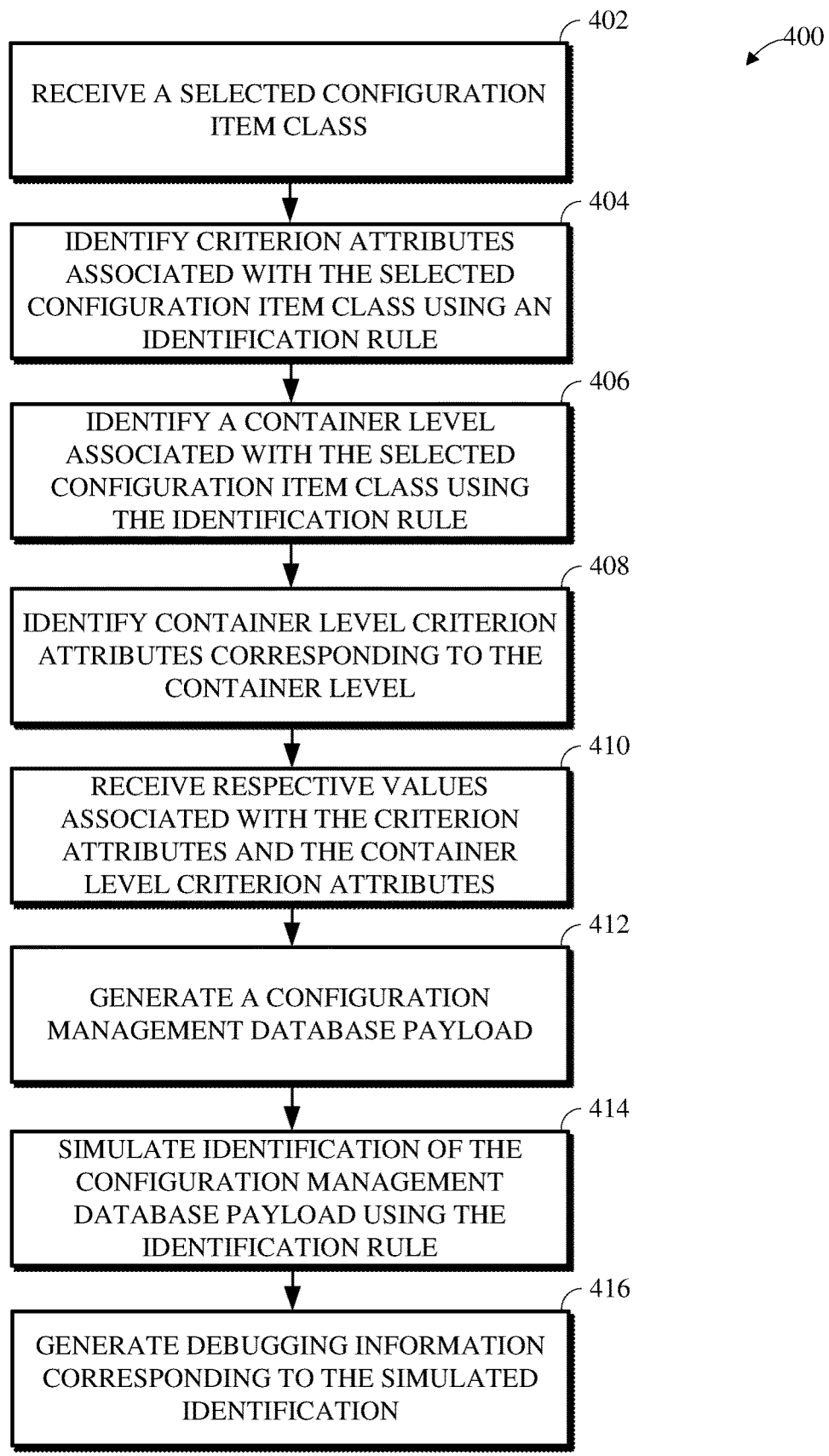
FIG. 4 is a flowchart illustrating an example technique for configuration management identification rule testing in accordance with implementations of the present disclosure.

FIG. 4 is a flowchart illustrating an example technique 400 for configuration management identification rule testing in accordance with implementations of the present disclosure. In some implementations, the technique 400 can be executed using computing devices, such as the systems, modules, and devices described with respect to FIGS. 1, 2, and 3, including the system 300. For example, the technique 400 can be implemented using the identification simulation 328 of FIG. 3. In some implementations, the technique 400 can be performed, for example, by executing a machine-readable program or other computer-executable instructions, such as instructions or programs described according to JavaScript, C, or other such instructions. The steps, or operations, of the technique 400 or any other method, process, or algorithm described in connection with the implementations disclosed herein can be implemented directly in hardware, firmware, software executed by hardware, circuitry, or a combination thereof.

At 402, the technique 400 can receive a selected configuration item ("CI") class. For example, as described above, the client interface 308 can receive a selected CI class. At 404, the technique 400 can identify criterion attributes associated with the selected CI class. For example, as described above, the criterion attribute identification 312 can identify criterion attributes, as is generally illustrated in FIG. 6 at 610, associated with the selected CI class using an identification rule identified as corresponding to the selected CI class. At 406, the technique 400 can identify a container level associated with the selected CI class. For example, the container level identification 316 can identify one or more container levels, as is generally illustrated in FIG. 6 at 618, associated with the selected CI class using the identified identification rule. A container level can include a dependency associated with the selected CI class. For example, a CI class can include Tomcat. Tomcat can have a dependency on hardware (e.g., Tomcat runs on hardware, such as a server).

At 408, the technique 400 can identify container level criterion attributes corresponding to the container level. For example, the container level criterion attribute identification 320 can identify one or more container level criterion attributes, as is generally illustrated in FIG. 6 at 620, corresponding to respective container levers using the identified identification rule. A container level criterion attribute can include information that identifies CIs associated a respective container level. For example, an identified container level can include hardware. A container level criterion attribute associated with the container level can include a serial number that identifies the hardware. In some implementations, the technique 400 can receive a selected CI class at 402 and then identify a container level corresponding to the selected CI class at 406 and identify container level criterion attributes corresponding to the container level at 408. The technique 400 can then identify criterion attributes associated with the selected CI class at 404. At 410, the technique 400 can receive respective values associated with the criterion attributes and the container level criterion attributes. For example, a user can provide, at the web browser 304, values associated with the respective criterion attributes, as is generally illustrated in FIG. 6 at 612, and values associated with respective container level criterion attributes, as is generally illustrated in FIG. 6 at 622. At 412, the technique 400 can generate a configuration management database ("CMDB") payload using the respective values, the selected CI class, the identified criterion attributes, received values associated with respective criterion attributes, the identified container level, the identified container level criterion attributes, received values associated with respective container level criterion attributes, or a combination thereof. For example, the payload generation 324 can generate a CMDB payload. An example CMDB payload is generally illustrated in FIG. 6 at 604. A CMDB payload can include information corresponding to a plurality of CIs, such as, information indicating relationships between respective CIs. For example, a CMDB payload can include information indicating that a first CI runs on a second CI.

At 414, the technique 400 can simulate identification of the CMDB payload using the identification rule corresponding to the selected CI class, such as by using the identification simulation 328. Simulating identification of a CMDB payload can include comparing received values associated with respective criterion attributes to corresponding identification values associated with the identification rule, comparing respective values associated with respective container level criterion values to corresponding identification values associated with the identification rule, or a combination thereof. At 416, the technique 400 can generate debugging information corresponding to the simulated identification, such as by using the debugging information generation 332. The debugging information can include input information associated with the CMDB payload, log information corresponding to the information communicated by the identification simulation 328, output information associated with the CMDB payload, or a combination thereof, as described above with respect to FIG. 3. Example debugging information is generally illustrated in FIG. 8 at 808. The debugging information generation 332 can store the debugging information in the debugging information 336 on the database 118. The web browser 304 can display the debugging information, as described above.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Figure 5:
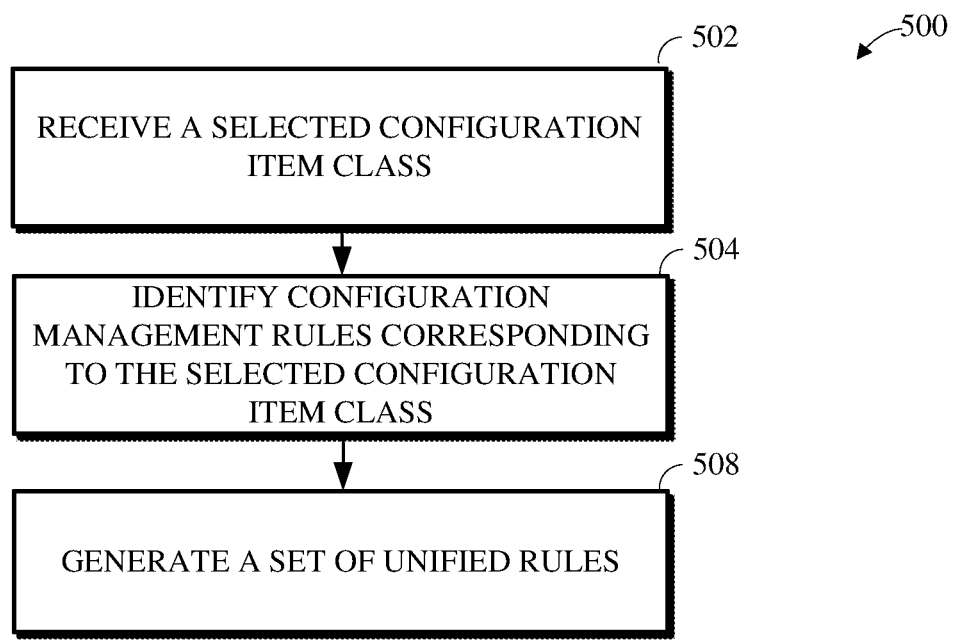
FIG. 5 is a flowchart illustrating an example technique for unifying configuration management rules associated with a selected CI class in accordance with implementations of the present disclosure.

FIG. 5 is a flowchart illustrating an example technique 500 for unifying configuration management rules associated with the selected CI class in accordance with implementations of the present disclosure. In some implementations, the technique 500 can be executed using computing devices, such as the systems, modules, and devices described with respect to FIGS. 1, 2, and 3, including the system 300. For example, the technique 500 can be implemented using the rule unification 334 of FIG. 3. In some implementations, the technique 500 can be performed, for example, by executing a machine-readable program or other computer-executable instructions, such as instructions or programs described according to JavaScript, C, or other such instructions. The steps, or operations, of the technique 500 or any other method, process, or algorithm described in connection with the implementations disclosed herein can be implemented directly in hardware, firmware, software executed by hardware, circuitry, or a combination thereof.

At 502, the technique 500 can receive a selected CI class. For example, as described above, the rule unification 334 can receive the selected CI class. In some implementations, as described above with respect to FIG. 3, a user can create configuration management rules corresponding to a CI class, change characteristics of the configuration management rules corresponding to a CI class, or a combination thereof. The use can use a set of unified rules that include configuration management rules (e.g., identification rules, reconciliation rules, metadata rules, other configuration management rules, or a combination thereof corresponding to the selected CI class) to create configuration management rules corresponding to the selected CI class, change configuration management rules corresponding to the selected CI class, review configuration management rules corresponding to the selected CI class, or a combination thereof. The technique 500 can generate the set of unified rules.

Figure 7:
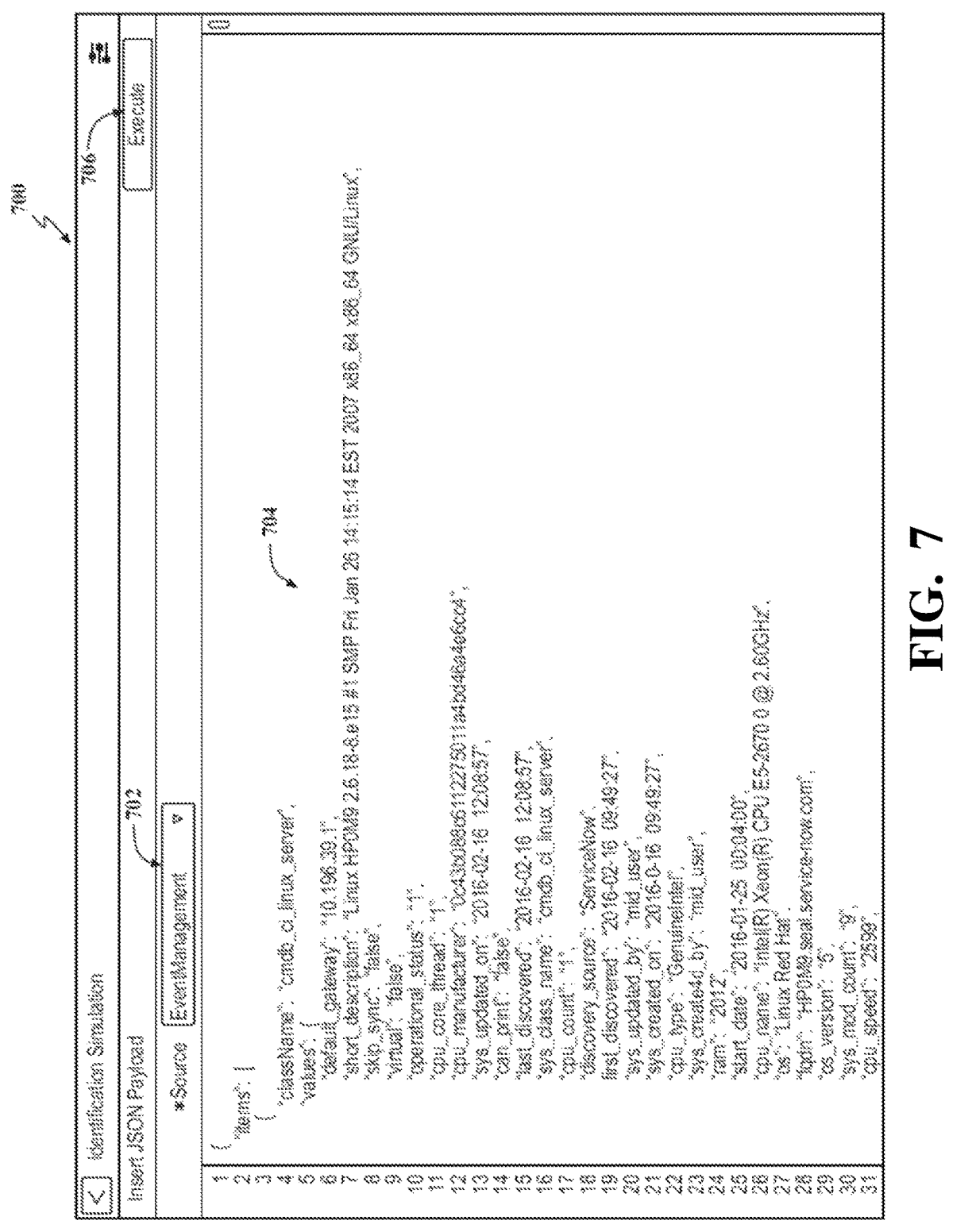

For example, at 504, the technique 500 can identify one or more configuration management rules corresponding to the selected CI class. For example, the rule unification 334 can identify one or more identification rules corresponding to the selected CI class, as is generally illustrated in FIG. 7 at 1006; one or more reconciliation rules corresponding to the selected CI class, as is generally illustrated in FIG. 7 at 1008; one or more other rules corresponding to the selected CI class; or a combination thereof in the configuration management rules 340. At 508, the technique 500 can generate a set of unified rules, as is generally illustrated in FIG. 7 at 1000. For example, the rule unification 334 can generate a set of unified rules that represents the identified configuration management rules corresponding to the selected CI class and metadata information (e.g., including containment and hosting rules) associated with the identified configuration management rules corresponding to the selected CI class. The rule unification 334 can store the unified rules in the configuration management rules 340.

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

To describe some implementations in greater detail, reference is next made to examples of graphical user interfaces associated with a configuration management identification rule testing system, such as the configuration management identification rule testing system 300. A graphical user interface can comprise part of a software graphical user interface constituting data that reflect information ultimately destined for display on a hardware device, such as the client 104 of FIG. 1. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

FIG. 6 is a diagram of an example display region 600 generated for presenting information associated with configuration management identification rule testing and providing a user interface for receiving user input in accordance with implementations of the present disclosure. The display region 600 includes an input section 602 and a payload display section 604. The input section 602 includes a data source selection 606 and a CI class selection 608. The data source selection 606 can include a drop-down selection or a user input selection. The data source selection 606 can receive a selected data source, as described above. The selected data source can indicate a source of CI data to be used to generate a CMDB payload. The CI class selection 608 can include a drop-down selection or a user input selection. The CI class selection 608 can receive a selected CI class, as described above. The selected CI class can indicate a CI type associated with the selected data source.

The input section 602 includes one or more criterion attribute fields 610 and one or more corresponding criterion attribute value inputs 612. The one or more criterion attribute fields 610 can display criterion attributes identified as being associated with the selected CI class using an identification rule identified as corresponding to the selected CI class, as described above with respect to FIG. 3. The one or more corresponding criterion attribute value inputs 612 can receive values corresponding to respective criterion attributes identified as being associated with the selected CI class, as described above. In some implementations, the input section 602 can include one or more additional criterion attribute selections 614 and one or more corresponding additional criterion attribute value inputs 616. The one or more additional criterion attribute selections 614 can receive additional criterion attributes associated with the selected CI class and the one or more corresponding additional criterion attribute value inputs 616 can receive additional criterion attribute values corresponding to respective additional criterion attributes.

The input section 602 includes one or more container level selections 618. The one or more container level selections 618 include a drop-down selection or a user input selection. In some implementations, the one or more container level selections 618 can display a selection of container levels identified as being associated with the selected CI class using the identified identification rule, as described above. The input section 602 includes one or container level criterion attribute fields 620 and one or more corresponding container level criterion attribute value inputs 622. The one or more container level criterion attribute fields 620 can display container level criterion attributes identified as being associated with respective container levels using the identified identification rule. The one or more container level criterion attribute value inputs 622 can receive container level criterion attribute values corresponding to respective container level criterion attributes, as described above.

In some implementations, the input section 602 can include one or more additional container level criterion attribute selections 624 and one or more corresponding additional container level criterion attribute value inputs 626. The one or more additional container level criterion attribute selections 624 can receive additional container level criterion attributes associated with the selected CI class and the one or more corresponding additional container level criterion attribute value inputs 626 can receive additional container level criterion attribute values corresponding to respective additional container level criterion attributes.

In some implementations, the payload display section 604 can be configured to display information associated with a CMDB payload to be generated using the information displayed on the input section 602. In some implementations, the display region 600 includes a generate selection 628 (e.g., a generate button). When the generate selection 628 is selected, a CMDB payload is generated, as described above. For example, the system 300 can generate the CMDB payload using the information displayed on the input section 602. In some implementations, the display region can include an execute selection 630. When the execute selection 630 is selected, a configuration management identification rule test can be executed, including simulating identification of the CMDB payload. For example, as described above, the system 300 can simulate identification of the CMDB payload using the identified identification rule. The display region 600 can include additional or fewer features than those described herein.

FIG. 7 is a diagram of an example display region 700 generated for presenting information associated with a configuration management database payload in accordance with implementations of the present disclosure. The display region 700 includes a data source selection 702. The data source selection 702 includes features similar to those of the data source selection 606 of FIG. 6. The data source selection 702 can receive a selected data source, as described above.

The display region 700 includes a payload input section 704. The payload input section 704 can be configured to receive information associated with a CMDB payload. For example, a user can input (e.g., enter manually, import from a file, copy and paste from a file, or other suitable input mechanism) the information associated with the CMDB payload into the payload input section 704. The CMDB payload can include a CMDB payload generated using the system 300 of FIG. 3, a CMDB payload generated via the generated selection 628 of the display region 600 of FIG. 6, a CMDB payload generated by a third party CMDB, generated manually, generated using other suitable mechanisms, or a combination thereof.

The display region 700 includes an execute selection 706. The execute selection 706 includes features similar to those of the execute selection 630 of FIG. 6. When the execute selection 706 is selected, testing of a configuration management identification rule can be executed, including simulating identification of the CMDB payload. For example, as described above, the system 300 can simulate identification of the CMDB payload using the identified identification rule. In some implementations, the CMDB payload can include a production payload. When the execute selection 706 is selected, a production identification of the CMDB payload can be executed. A production identification of the CMDB payload can include determining whether information associated with the CMDB payload is consistent with identification information associated with an identification rule identified as corresponding to the CMDB payload. The system 300 can allow CIs associated with the CMDB payload to be stored in a CMDB, such as the CMDB 344, in response to the information associated with the CMDB payload being consistent with the identification information. Conversely, the system 300 can prevent CIs associated with the CMDB payload from being stored in the CMDB 344 in response to the information associated with the CMDB payload being inconsistent with the identification information. The display region 700 can include additional or fewer features than those described herein.

Figure 9:
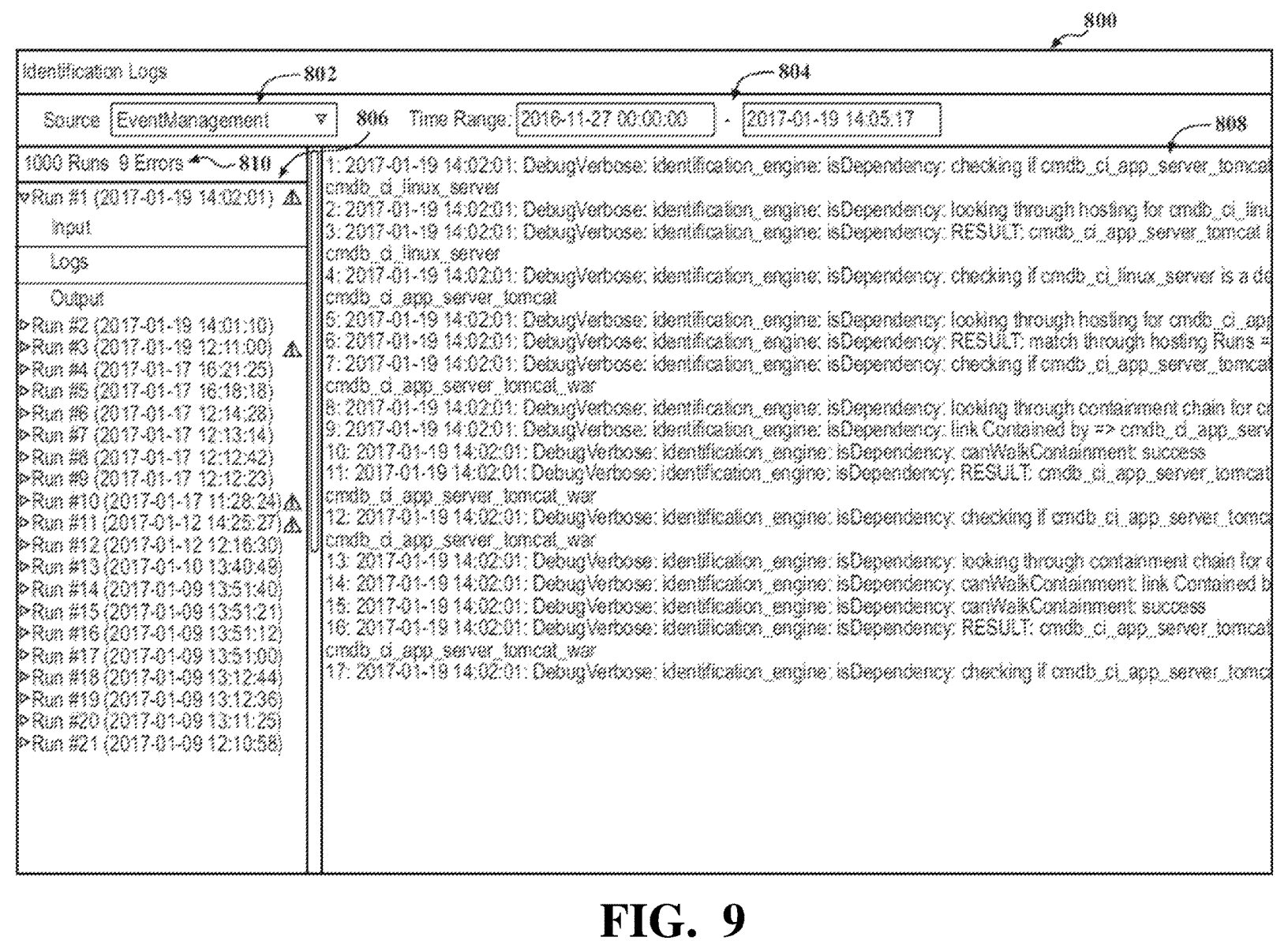

FIGS. 8 and 9 are diagrams of an example display region 800 generated for presenting configuration management debugging information. The display region 800 includes a data source selection 802. The data source selection 802 includes features similar to those of the data source select 606 of FIG. 6. The display region 800 can include a time range input 804. The time range input 804 can receive a first time value and a second time value. The first time value indicates a desired time range lower bound and the second time value indicates a desired time range upper bound. In some implementations, the system 300 can identify runs having a timestamp value between the first time value and the second time value. A run can include a simulated identification or a production identification, as described above. The runs can be associated with debugging information stored in the debugging information 336 of FIG. 3.

The time range can include any suitable time range (e.g., ranges via seconds, minutes, hours, days, weeks, months, years, etc.). For example, a time range of 1 minute is generally illustrated in FIG. 8 and a time range that includes a first time value of Nov. 27, 2016 at 00:00:00 and a second time value of Jan. 19, 2017 at 14:05:17 is generally illustrated in FIG. 9. With respect to the time range generally illustrated in FIG. 8, the system 300 of FIG. 3 identifies runs having a timestamp value between Jan. 19, 2017 at 14:01:18 and Jan. 19, 2017 at 14:02:18. The display region 800 can include a run list section 806. The runs identified as having a timestamp value between the first time value and the second time value can be displayed as a list in the run list section 806. As is generally illustrated in FIG. 8, the run list section 806 includes one run having a time stamp between the first time value and the second time value. As is generally illustrated in FIG. 9, the run list section 806 can include a plurality of runs having timestamp values between the first time value and the second time value.

Runs in the run list section 806 can be expandable and can include input information, log information, and output information, as described above. Information associated with the input information, log information, output information, or a combination thereof is displayed in a debugging information section 808 when one of the input information, log information, our output information associated with a run is selected. As is generally displayed in FIGS. 8 and 9, the log information can include debugging information associated with the run, as described above. The debugging information can correspond to a run. A run can include a simulated identification or a production identification, as described above.

In some implementations, the display region 800 includes a statistics section 810. The statistics section 810 can be configured to display a total number of runs identified as having timestamp values between the first time value and the second time value and a total number of errors associated with the total number of runs. An error can correspond to a determination that information associated with the CMDB payload (e.g., associated with the run) is inconsistent with identification information associated with the identification rule corresponding to the CMDB payload. The display region 800 can include additional or fewer features than those described herein.

Figure 11:
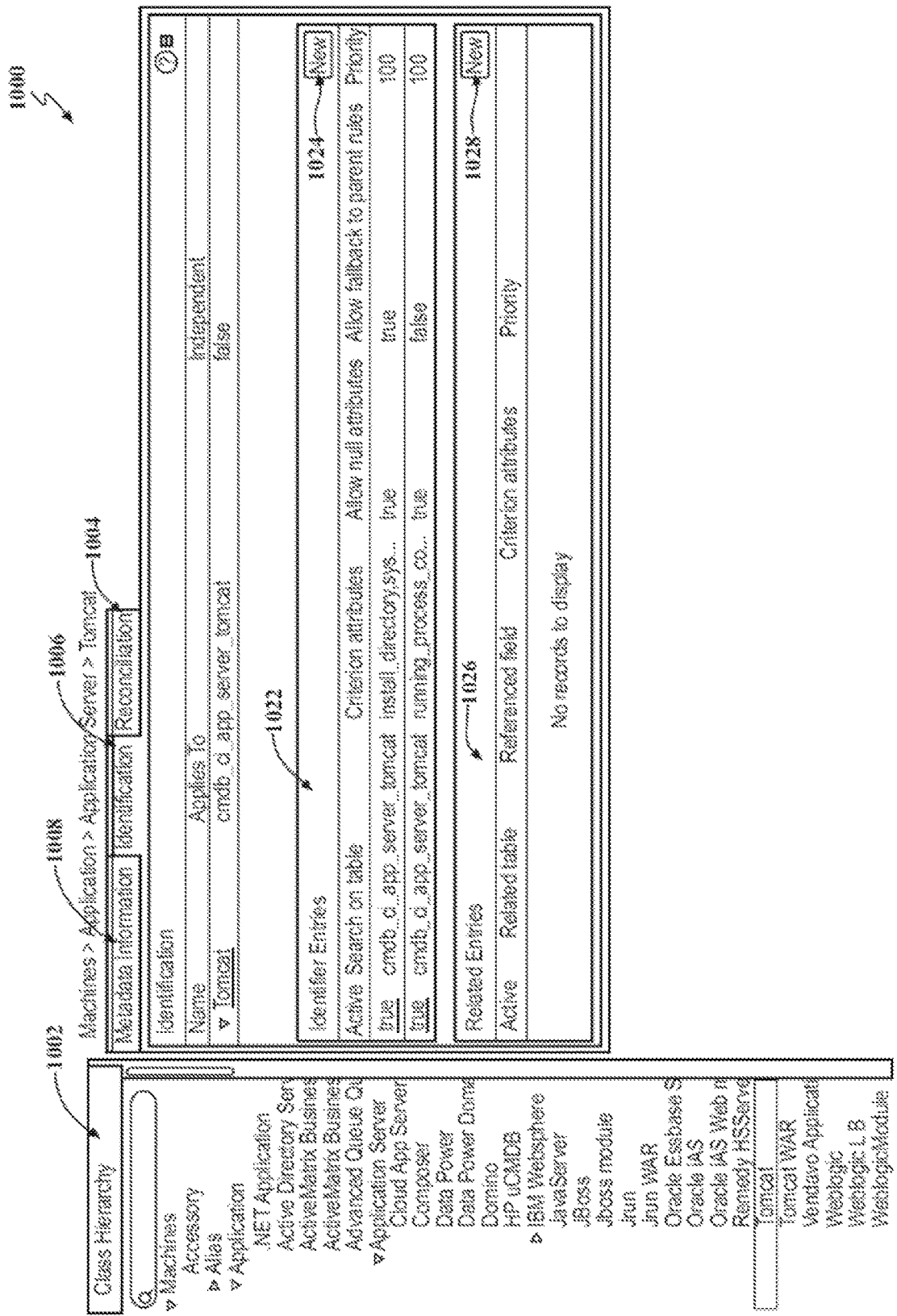
Figure 12:
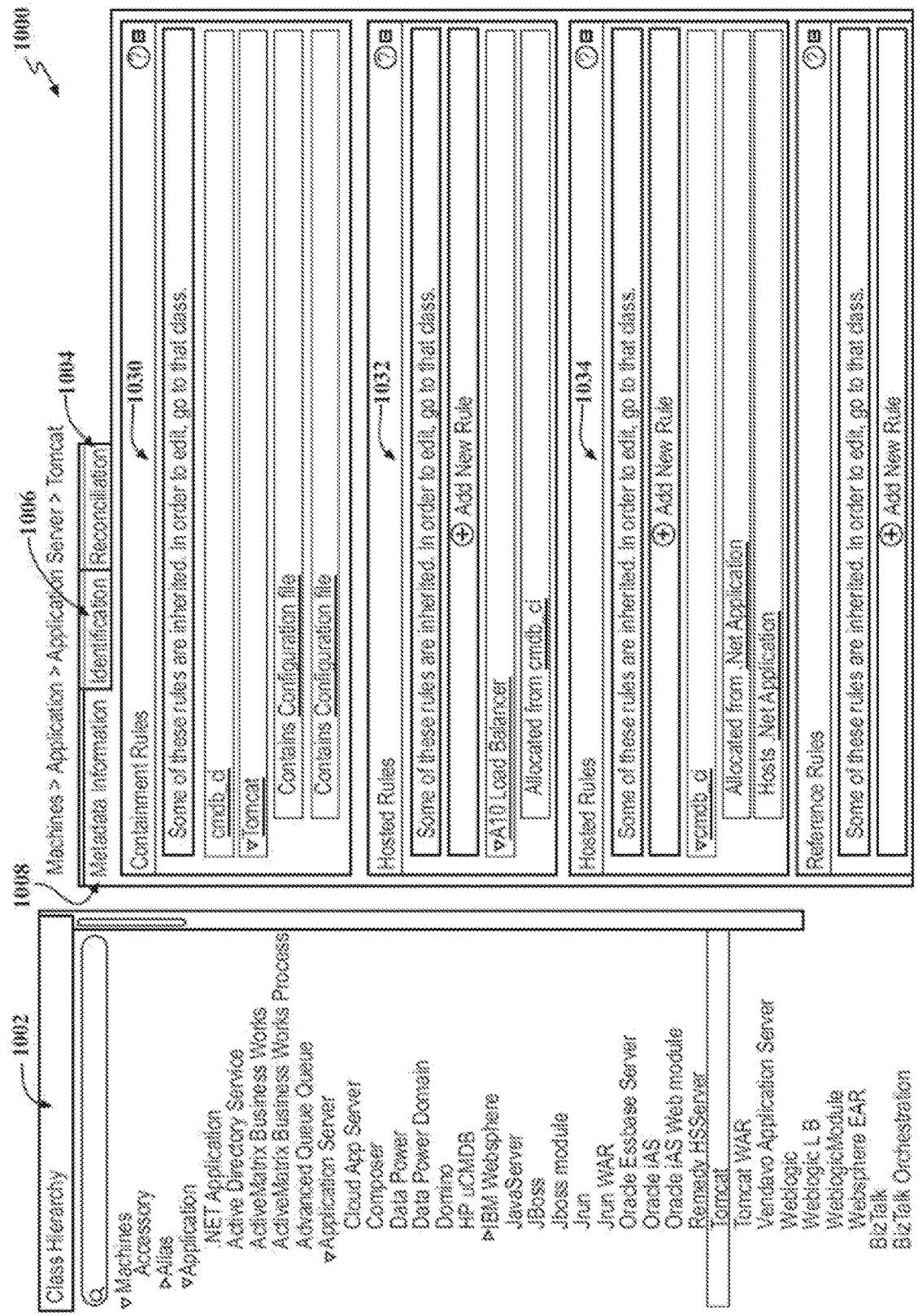

FIGS. 10-12 are diagrams of an example display region 1000 for presenting information associated with rule unification. The display region 1000 includes a class hierarchy section 1002. The class hierarchy section 1002 can display a hierarchy of CI classes. The class hierarchy section 1002 can receive a selected CI class. For example, the selected CI class can include Tomcat, as is generally illustrated in FIG. 10. The display region 1000 includes a reconciliation rule tab 1004, an identification rule tab 1006, and a metadata information tab 1008.

The reconciliation rule tab 1004 can be configured to display information including metadata associated with a reconciliation rule corresponding to the selected CI class, as described above with respect to FIG. 3. For example, the reconciliation rule tab 1004 can include a reconciliation rule section 1010. The reconciliation rule section 1010 can be configured to display a data source field that indicates a data source corresponding to the reconciliation rule, an applies to field that indicates a CI class that the reconciliation rule applies to, an attributes field that indicates attributes corresponding to the reconciliation rule, an update with null field that indicates update characteristics of the reconciliation rule, a filter condition field that indicates filter conditions corresponding to the reconciliation rule, and an active field that indicates whether the reconciliation rule is active.

The reconciliation rule tab 1004 can include a new selection 1012 (e.g., a new button). The new selection 1012 can be configured to generate a new reconciliation rule corresponding to the selected CI class when the new selection 1012 is selected. As described above with respect to FIG. 3, when the new selection 1012 is selected, a user can be prompted to create and/or change related configuration management rules and/or information.

The reconciliation rule tab 1004 can include a data source precedence section 1014 that can display information associated with a data source precedence corresponding to the reconciliation rule. A data source precedence can indicate whether a data source corresponding to the reconciliation rule is permitted to update the CMDB. The data source precedence section 1014 can include a new selection 1016 (e.g., a new button) that is configured to generate a new data source precedence corresponding to the reconciliation rule when the new selection 1016 is selected. As described above with respect to FIG. 3, when the new selection 1016 is selected, a user can be prompted to create and/or change related configuration management rules and/or information.

The reconciliation rule tab 1004 can include a staleness rule section 1018. The staleness rule section 1018 can include information indicating when a CI associated with the selected CI class is considered stale. For example, the staleness rule section 1018 includes an effective duration field. The effective duration field indicates a time duration. The time duration corresponds to a time when a CI corresponding to the selected CI class is stale. For example, the time duration can indicate that a CI corresponding to the selected CI class is stale if information corresponding to the CI has not been updated for more than 1 day. The staleness rule section 1018 can include a new selection 1020 (e.g., a new button) that is configured to generate a new staleness rule when the new selection 1020 is selected. As described above with respect to FIG. 3, when the new selection 1020 is selected, a user can be prompted to create and/or change related configuration management rules and/or information.

The display region 1000 includes the identification rule tab 1006, as is generally illustrated in FIG. 11. The identification rule tab 1006 can be configured to display information including metadata associated with an identification rule corresponding to the selected CI class, as described above. For example, the identification rule tab 1006 can include an identifier entries section 1022. The identifier entries section 1022 can include information indicating dependencies between the selected CI class and other CI classes.

The identifier entries section 1022 can include a new selection 1024 (e.g., a new button) configured to generate a new dependency between the selected CI class and another CI class when selected. The identification rule tab 1006 can include a related entries section 1026. The related entries section 1026 can include information indicating CI classes that are related to the selected CI. The related entries section 1026 can include a new selection 1028 (e.g., a new button) that is configured to generate a new related entry indicating that a CI class is related to the selected CI class when the new selection 1028 is selected. As described above with respect to FIG. 3, when the new selection 1028 is selected, a user can be prompted to create and/or change related configuration management rules and/or information.

The display region can include a metadata information tab 1008, as is generally illustrated in FIG. 12. The metadata information tab 1008 can be configured to display a set of metadata information associated with the identification rule, the reconciliation rule, or a combination thereof, as described above. The metadata information tab 1008 can include a containment rules section 1030. The containment rules section 1030 can be configured to display information associated with containment rules associated with the selected CI class. The metadata information tab 1008 can include one or more hosting rules sections 1032. The one or more hosting rules sections 1032 can include information associated with one or more hosting rules associated with the selected CI class. The metadata information tab 1008 can include a reference rules section 1034. The reference rules section 1034 can be configured to display information associated with one or more reference rules corresponding to the selected CI class. The display region 1000 can include additional or fewer features than those described herein.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for configuration management identification rule testing, the system comprising:
a processor and a memory, the memory including instructions executable by the processor to:
receive one or more inputs indicative of a data source and a configuration item class associated with the data source;
identify an identification rule based on the configuration item class;
identify, using the identification rule, one or more criterion attributes corresponding to the configuration item class;
identify, using the identification rule, a container level associated with the configuration item class;
identify, using the identification rule, one or more container level criterion attributes corresponding to the container level;
after identifying the one or more criterion attributes and the one or more container level criterion attributes, receive respective values associated with the one or more criterion attributes and the one or more container level criterion attributes;
generate a configuration management database payload using the received respective values;
simulate identification of the configuration management database payload to generate respective expected values for the one or more criterion attributes and the one or more container level criterion attributes using the identification rule;
determine whether the received respective values are consistent with the respective expected values; and
generate debugging information associated with the simulated identification, wherein the debugging information comprises the received respective values that are consistent with the respective expected values, the received respective values that are inconsistent with the respective expected values, and one or more recommendations to adjust the received respective values that are inconsistent with the respective expected values to be consistent with the respective expected values before the received expected values are stored in a configuration management database.

2. The system of claim 1, wherein the debugging information comprises a timestamp value within an identified time range.

3. The system of claim 1, wherein the configuration management database payload is generated using the received respective values and the container level.

4. The system of claim 1, wherein the identification rule includes identification information indicating at least one criterion attribute and at least one container level associated with the configuration item class.

5. The system of claim 1, the memory including instructions executable by the processor to:
identify at least one reconciliation rule associated with the configuration item class.

6. The system of claim 5, the memory including instructions executable by the processor to:
generate a set of unified rules corresponding to the configuration item class using metadata associated with the identification rule and the at least one reconciliation rule.

7. The system of claim 1, wherein the identification rule indicates a relationship between the configuration item class and the container level.

8. The system of claim 1, wherein the respective values associated with the one or more criterion attributes are indicative of one or more configuration items associated with the configuration item class.

9. The system of claim 1, wherein the one or more container level criterion attributes are indicative of one or more configuration items associated with the container level.

10. The system of claim 1, wherein the container level comprises an operational dependency associated with the configuration item class.

11. The system of claim 1, wherein the one or more inputs are received via a graphical user interface configured to be displayed on a user device.

12. The system of claim 11, wherein the respective values are received via the graphical user interface.

13. A method for configuration management identification rule testing, the method comprising:
  receiving one or more inputs indicative of a data source and a configuration item class associated with the data source;
  identifying an identification rule based on the configuration item class;
  identifying, using the identification rule, one or more criterion attributes corresponding to the configuration item class;
  identifying, using the identification rule, a container level associated with the configuration item class;
  identifying, using the identification rule, one or more container level criterion attributes corresponding to the container level;
  after identifying the one or more criterion attributes and the one or more container level criterion attributes, receiving respective values associated with the one or more criterion attributes and the one or more container level criterion attributes;
  generating a configuration management database payload using the received respective values;
  simulating identification of the configuration management database payload to generate respective expected values for the one or more criterion attributes and the one or more container level criterion attributes using the identification rule;
  determining whether the received respective values are consistent with the respective expected values; and
  generating debugging information associated with the simulated identification, wherein the debugging information comprises the received respective values that are consistent with the respective expected values, the received respective values that are inconsistent with the respective expected values, and one or more recommendations to adjust the received respective values that are inconsistent with the respective expected values to be consistent with the respective expected values before the received respective values are stored in a configuration management database.

14. The method of claim 13, wherein the debugging information comprises a timestamp value within an identified time range.

15. The method of claim 13, wherein the identification rule includes identification information indicating at least one criterion attribute and at least one container level associated with the configuration item class.

16. The method of claim 13, wherein generating the configuration management database payload includes using the received respective values and the container level.

17. The method of claim 13, comprising identifying at least one reconciliation rule associated with the configuration item class.

18. The method of claim 17, comprising generating a set of unified rules corresponding to the configuration item class using metadata associated with the identification rule and the at least one reconciliation rule.

19. The method of claim 13, wherein the identification rule indicates a relationship between the configuration item class and the container level.

20. A non-transitory computer-readable storage medium, comprising executable instructions that, when executed by a processor, facilitate performance of operations, comprising:
  receiving one or more inputs indicative of a data source and a configuration item class associated with the data source;
  identifying an identification rule based on the configuration item class;
  identifying, using the identification rule, one or more criterion attributes corresponding to the configuration item class;
  identifying, using the identification rule, a container level associated with the configuration item class;
  identifying, using the identification rule, one or more container level criterion attributes corresponding to the container level;
  after identifying the one or more criterion attributes and the one or more container level criterion attributes, receiving respective values associated with the one or more criterion attributes and the one or more container level criterion attributes;
  generating a configuration management database payload using the received respective values;
  simulating identification of the configuration management database payload to generate respective expected values for the one or more criterion attributes and the one or more container level criterion attributes using the identification rule;
  determining whether the received respective values are consistent with the respective expected values; and
  generating debugging information associated with the simulated identification, wherein the debugging information comprises the received respective values that are consistent with the respective expected values, the received respective values that are inconsistent with the respective expected values, and one or more recommendations to adjust the received respective values that are inconsistent with the respective expected values to be consistent with the respective expected values before the received respective values are stored in a configuration management database.

* * * * *